United States Patent [19]
Turner

[11] Patent Number: 6,002,222
[45] Date of Patent: *Dec. 14, 1999

[54] DEVICE AND METHOD FOR CONTROLLING A TIME VARIABLE INDUCTIVE LOAD

[75] Inventor: Michael James Turner, W. Yorkshire, United Kingdom

[73] Assignee: Switched Reluctance Drives Limited, England, United Kingdom

[*] Notice: This patent is subject to a terminal disclaimer.

[21] Appl. No.: 09/012,290

[22] Filed: Jan. 23, 1998

[30] Foreign Application Priority Data

Jan. 24, 1997 [GB] United Kingdom .................... 9701438

[51] Int. Cl.⁶ ........................................ H02P 1/46
[52] U.S. Cl. .......................... 318/254; 318/701; 318/439
[58] Field of Search ..................... 318/701, 685, 318/696, 254, 439, 138

[56] References Cited

U.S. PATENT DOCUMENTS

| | | |
|---|---|---|
| 4,339,703 | 7/1982 | Rolff et al. . |
| 4,584,506 | 4/1986 | Kaszmann ............................ 318/254 |
| 4,710,815 | 12/1987 | Douglas et al. . |
| 4,713,594 | 12/1987 | Bose et al. . |
| 4,896,089 | 1/1990 | Kliman et al. ......................... 318/701 |
| 4,933,621 | 6/1990 | MacMinn et al. ..................... 318/696 |
| 5,166,591 | 11/1992 | Stephens et al. . |
| 5,194,795 | 3/1993 | Bahn et al. ............................ 318/685 |
| 5,530,332 | 6/1996 | Rees ...................................... 318/685 |
| 5,530,333 | 6/1996 | Turner ................................... 318/701 |
| 5,850,130 | 12/1998 | Fujisaki et al. ........................ 318/439 |

FOREIGN PATENT DOCUMENTS

| | | |
|---|---|---|
| 0259005 | 7/1987 | European Pat. Off. . |
| 0397514 | 5/1990 | European Pat. Off. . |
| 0613235 | 2/1994 | European Pat. Off. . |
| 0635931 | 7/1994 | European Pat. Off. . |
| 2217970 | 4/1972 | Germany . |
| 2105536 | 9/1981 | United Kingdom . |

OTHER PUBLICATIONS

Lawrenson et al., "Variable–speed switched reluctance motors", IEE PROC., vol. 127, Pt. B, No. 4, Jul. 1980, pp. 253–265.

*Primary Examiner*—Jonathan Salata

[57] ABSTRACT

A switched reluctance machine controller derives an error signal from the difference between a current reference and the phase winding current. The error signal is applied to a pair of hysteresis circuits which define adjacent hysteresis bands above and below the reference current. The magnitude of the hysteresis bands may vary as a function of the current reference. The outputs of the hysteresis circuits are received by control logic which permits current to be applied to the phase winding when the current is below the hysteresis bands, removes current from the phase winding when the current is above the hysteresis bands and allows the phase winding current to freewheel when the current is between the upper and lower hysteresis limits. The power device used for freewheeling alternates between an upper power device and a lower power device.

12 Claims, 14 Drawing Sheets

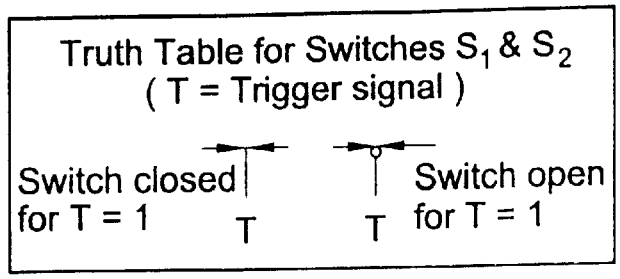
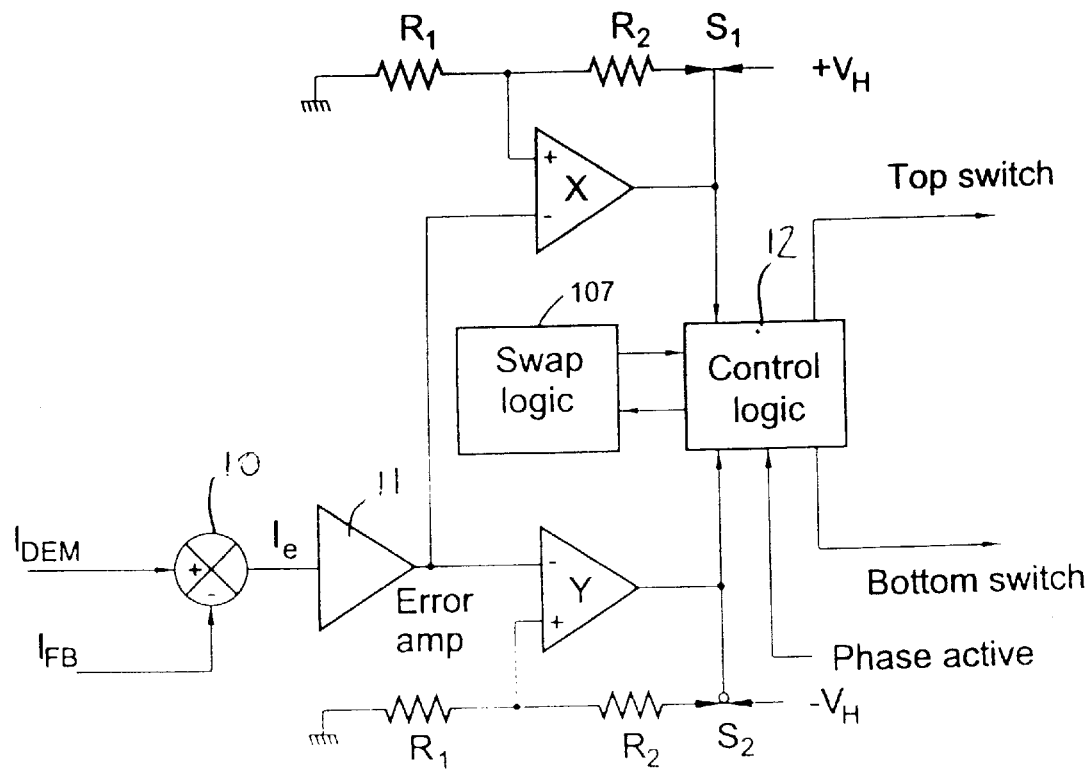
Fig 7(a)
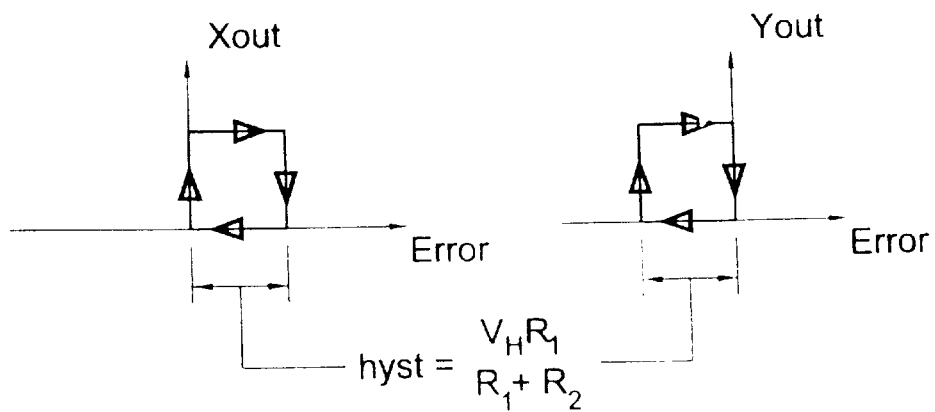
$$\text{hyst} = \frac{V_H R_1}{R_1 + R_2}$$

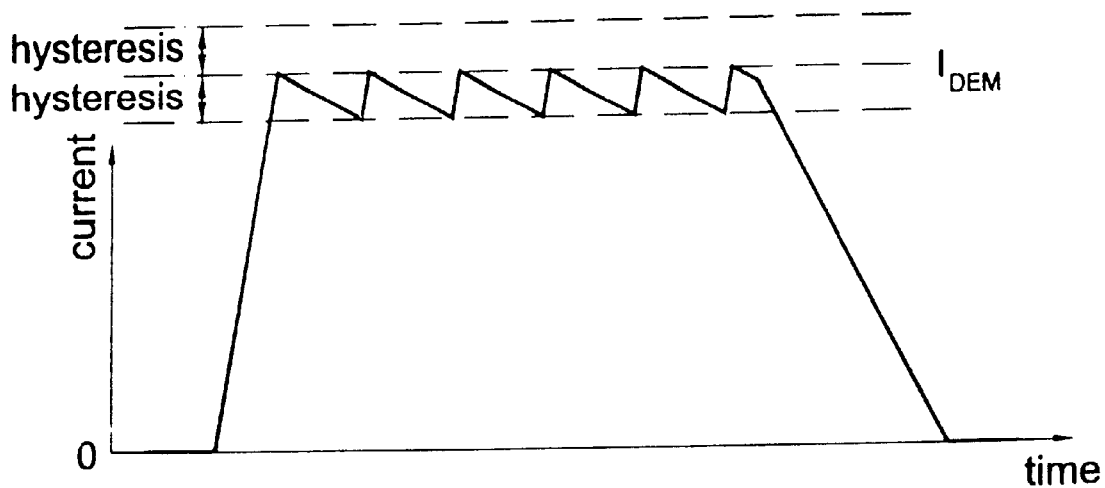
Fig 7(b)
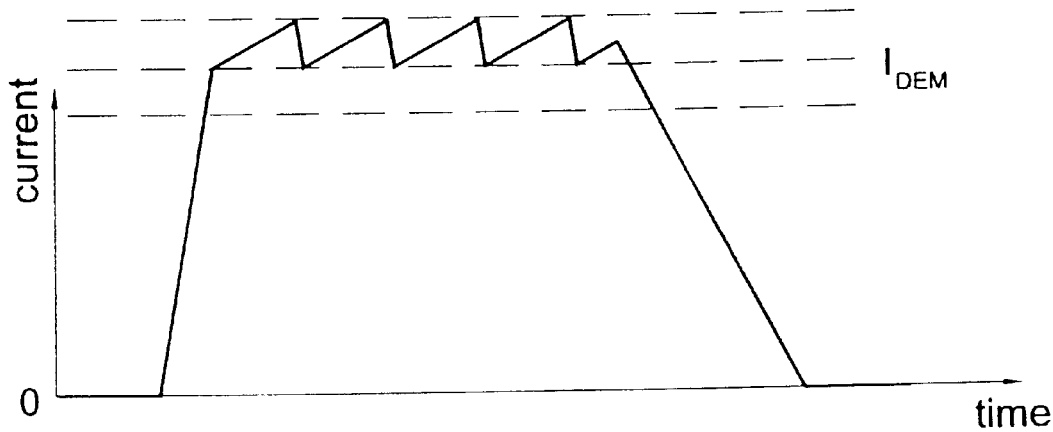
Fig 7(c)
| X | Y | POWER STATE | REMARK |
|---|---|---|---|
| 0 | 0 | ON | Current too low |
| 0 | 1 | FW | Illegal condition |
| 1 | 0 | FW | Current within bounds |
| 1 | 1 | OFF | Current too high |
Fig 7(d)

DEVICE AND METHOD FOR CONTROLLING A TIME VARIABLE INDUCTIVE LOAD

This application claims priority of the Great Britain patent application 9701438.5 filed on Jan. 24, 1997, entitled "Control of an Inductive Load."

FIELD OF THE INVENTION

This invention relates to controllers for loads of varying inductance, such as switched reluctance machines. The invention also relates to a hysteresis circuit.

BACKGROUND OF THE INVENTION

A switched reluctance motor is an example of an electrical load in which the inductance is not constant with time or machine operation, i.e., rotor angle. FIG. 1(a) illustrates a typical three-phase switched reluctance (SR) machine and FIGS. 1(b) and (c) illustrate well-known examples of electronic switching circuits which may be used to control an SR machine. The SR machine essentially consists of a stator s defining stator poles 1, 1', 2, 2', 3, 3' on which are wound phase windings w, of which only one is shown in association with a set of poles 2, 2'. The machine also has a rotor with salient poles 4, 4' and 5, 5'. The electronic circuits are arranged to supply unidirectional currents to the phase windings w.

In the control circuits of FIGS. 1(b) and (c), each phase winding of the machine in FIG. 1(a) is associated with a circuit leg comprising at least one electronic switch t in series with each winding across a dc supply Vs. A general treatment of the principles of SR machines is given in the paper 'The Characteristics, Design and Applications of Switched Reluctance Motors and Drives' by Stephenson et al. presented at PCIM '93 Conference and Exhibition at Nurnberg, Germany, Jun. 21st–24th 1993.

Proposed means for controlling an SR machine to run at different speeds include operation in three characteristic regions which can be designated as 'low-speed', 'medium-speed' and 'high-speed' regions. For background and explanation on this see 'Variable-Speed Switched Reluctance Motors' by Lawrenson et al. IEE Proceedings Part B, Vol. 127, No. 4, Jul. 1980. In the low-speed region the current is controlled by the well-known method of 'chopping'. The present invention relates to improvements in the means of implementing chopping control of the phase current. FIGS. 2(a), (b) and (c) represent one phase leg of the circuit shown in FIG. 1(b) redrawn for clarity with the phase leg in three possible states, here referred to as 'ON', 'FW' ('freewheeling') and 'OFF'. The circuit is in the ON state when both power switches are closed and the full dc bus voltage Vs is applied to the phase winding w, increasing the magnetic flux F at the maximum possible rate (see FIG. 2(a)).

When flux has been established in the winding in this way and either one of the switches is open, the current is said to freewheel (see FIG. 2(b)), i.e. the circuit is in the FW state with only one switch closed, the current flowing through this switch and one diode. The effective winding voltage under these conditions is determined by the small voltage across the switch, the diode and the winding resistance. The flux F thus falls relatively slowly, as shown in FIG. 2(b).

The circuit is in the OFF condition when both switches are open and the phase current is carried by the diodes. The winding then has the full dc bus voltage applied in reverse so that the flux F will fall until the current is zero and the diodes become non-conducting (see FIG. 2(c)).

The simplest method of current chopping is to alternate between ON and OFF states to maintain the mean current level near a desired value. This is shown in FIG. 3(a). Chopping between the ON and OFF states is acceptable at low power levels where the switches (e.g. semiconductor switches such as metal oxide silicon dioxide field effect transistors or insulated gate bipolar transistors) can switch at ultrasonic frequencies. This is advantageous in terms of limiting acoustic noise.

At higher power levels however, the losses (both in the semi-conductor switches and other components) associated with ultrasonic switching become large and it is usually necessary to reduce the switching frequency. If the ON/OFF strategy were used the current (and the flux) excursions at these reduced frequencies might be large, resulting in a rise in objectionable acoustic noise and, possibly, control problems as well. For these reasons the FW state is often incorporated into the switching pattern, enabling retention of relatively small current excursions even though the switching frequency is reduced. This is shown in FIG. 3(b) for a 'motoring' mode and in FIG. 3(c) for a 'generating' mode.

The behaviour of the winding current in a reluctance motor during freewheel (FW) is determined not only by the applied voltage but also by the variation of the phase inductance which is a function of the rotation of the machine. Inductance is defined as flux linkage per unit current so that L=F/I, hence I=F/L. If the effective winding voltage during freewheeling is small, the flux can be considered constant over a short period and the current during that period will therefore follow the reciprocal of the inductance profile, i.e. the freewheeling current will reduce when the load inductance rises and increase when it falls. At low rotational speeds, however, the rate of change of inductance with time (dL/dt) is small and the reduction in flux with time during freewheeling becomes significant over a machine phase period. At very low speeds, the freewheeling current will fall even when the inductance is decreasing, because a small winding voltage causes the flux to fall faster than the inductance. The behaviour of the freewheeling current under these differing conditions has important consequences for the current control system, as the controller has to be able to function correctly in all these different conditions. In a typical control system for a switched reluctance motor, the phase windings W will be energised whilst their inductance is increasing with respect to rotor angle (the motoring mode) or when the inductance is falling with respect to rotor angle (the braking or generating mode).

In the prior art, the control considerations described above have been implemented in a variety of ways, each with its own advantages and disadvantages.

One of the simplest methods is to use one comparator for each phase, the current feedback being compared directly with the reference (demand) value. A hysteresis band separates the switching points. The width of this band is usually varied to provide a suitable compromise between current excursions, switching frequency and acoustic noise. A typical circuit is illustrated in FIG. 4.

In a motoring mode (i.e. in which the net power flow is from the source to the load), the controller regulates current by alternating between the ON and FW states, with both switches switched off at the end of the phase period. FIG. 5(a) shows a typical current waveform. The change from motoring to a generating mode requires the MOT/GEN logic signal shown in FIG. 4. In the generating mode (i.e. in which the net power flow is from the load to the source), the controller chops by alternating between FW and OFF, though the ON state must first be used to build up flux (and hence phase current) to the required working value. FIG. 5(b) shows a typical current waveform.

While this system has the advantages of using only one comparator and only one hysteresis band, it has a number of disadvantages. These are particularly apparent at low-speeds whilst generating. Because the generating freewheel current rises only if the speed is high enough, at low speeds (particularly at high currents when the effective freewheel winding voltage is greatest) the current decays below the required value, as illustrated in FIG. 5(c). The output of the generator is then reduced. A further drawback is the dependence on a logic signal for switching between motoring and generating modes. This signal may be difficult to generate reliably, especially during transient conditions. This may lead to loss of control of the current, resulting in nuisance tripping or even switch failure.

A second proposed system seeks to overcome these difficulties by using two comparators. The two comparators have the same reference, but the hysteresis band of one spans that of the other, as shown in FIG. 6(a). Essentially, the 'outer' comparator is used to modify the behaviour of the circuitry controlled by the 'inner' comparator so that, for most of the time, chopping occurs between the switching points of the inner comparator only. The power switches are switched off at the end of the phase period as before. In the motoring mode, this system behaves like the single comparator case and chopping is controlled by the inner hysteresis band only, as shown in FIG. 6(b).

In the generating mode, the controller starts in the same mode with both switches closed until the current reaches the upper level of the inner comparator, whereupon one switch is opened and the phase freewheels. The freewheel current rises further (because the system is generating) until the upper level of the outer comparator is reached whereupon the second switch is also opened. The inner comparator now operates in the generating mode, selecting either FW or OFF. Chopping between FW and OFF continues on the inner band unless the current fails to rise while the circuit is in the FW state. If the current falls to the lower level of the outer comparator, both switches are closed, and the resulting ON state raises the current into the control band of the inner comparator. This is illustrated in FIG. 6(c).

This system has some advantages. For example, it keeps control of the current at all times, irrespective of whether the drive is motoring or generating and avoids the problems of decaying currents at low speeds associated with the single comparator solution.

However, it has disadvantages which may render it of little value in some applications. It suffers from relatively large transient excursions of current to the outer hysteresis bands which may be objectionable in some applications. This is made worse by the fact that the outer band must generally be wide so as to keep it reliably distinct from the inner one over the full working range of current despite noise, drift or other possible sources of signal corruption.

SUMMARY OF THE INVENTION

The present invention is an improvement on the controller for a time variable inductive load. In a first aspect of the invention, the controller includes a circuit for switching. The switching circuit connects the load to a source of electric power. Further, the switching circuit is actuatable into (i) a first arrangement to supply energy from the source of electric power through the switching circuit, (ii) a second arrangement to return energy from the load to the source of electric power, and (iii) a third, freewheel, arrangement in which the current recirculates through the load.

The controller further includes a control circuit. The control circuit comprises a lower hysteresis circuit and an upper hysteresis circuit. The lower hysteresis circuit has a lower hysteresis band that is defined between a first signal indicative of a lower current bound and a reference current level. The lower hysteresis circuit is operable to provide an output that changes from one output level to another output level to actuate the switching circuit into the third arrangement when the load current rises to the reference current level and that changes from its other output level back to its one output level to actuate the switching circuit into the first arrangement when the load current falls to the lower current bound. The upper hysteresis circuit has an upper hysteresis band that is defined between the reference current level and a second signal indicative of an upper current bound. The upper hysteresis circuit is operable to provide an output signal that changes from one output level to another output level to actuate the switching circuit into the second arrangement when the load current rises to the upper current bound and that changes from its other output level to its one output level to actuate the switching circuit into the third arrangement when the load current falls to the reference current level.

The controller is further operable to alternate the configuration the switching circuit each time the third arrangement is actuated.

Another aspect of the invention discloses a swap circuit is coupled to the control circuit. The swap circuit combined with the control circuit is operable to actuate the switching circuit into the third arrangement by differently configuring the switching circuit each time the third arrangement is actuated.

In particular embodiments of the invention, the switching circuit includes a pair of switching devices coupled to a source of electric power and to the load. The pair of devices is actuatable into: (i) a first arrangement where the pair of devices are closed to connect the load to the source of electric power, (ii) a second arrangement where the pair of devices are opened and there is no current path from the source of electric power through the pair of devices and the load, or (iii) a third arrangement in which only one of the pair of devices is closed and current recirculates around the load through the closed switching device. The control circuit is responsive to the swap circuit to alternate the actuation of the first and second switching devices of the pair of devices in the third arrangement.

In another aspect of the invention, the control circuit is responsive to the swap circuit and the output signals of the hysteresis circuits to produce control signals for actuating the first and second switching devices, such that the current is controlled in response to the deviation of the load current from the reference current, according to the states of the output signals of the hysteresis circuits, by: (i) actuating the first arrangement when the load current is below the lower current bound; (ii) actuating the second arrangement when the current is above the upper current bound; (iii) actuating the third, freewheel, arrangement when the load current reaches the reference current level from outside either of the lower and upper current bounds.

In a further aspect of the invention, the swap circuit is responsive to the output signals of the lower and upper hysteresis circuits and the swap circuit generates a swap output signal that toggles between a first and a second logic value in response to a change in the output signal of either hysteresis circuit.

In yet another aspect of the invention, a controller is provided for a time variable inductive load, such as a winding in a reluctance machine, where the controller comprises: error circuitry for deriving an error signal which is the difference between a reference signal indicative of a reference current and a feedback signal indicative of the load current; first and second switching devices coupled to a source of electric power and to the load, the first and second switching devices actuatable into: (i) a first switching arrangement where both the first and the second switching devices are closed to provide a current path from the source of electric power and through the first and second switching devices and the load, (ii) a second switching arrangement where both the first and second switching devices are opened and there is no current path from the source of electric power through the first and second switching devices and the load, or (iii) a freewheel arrangement in which only one of the first or second switching devices is closed and current recirculates around the load through the closed switching device; a switch control circuit coupled to the error control circuitry and the first and second switching devices: (i) for closing the first and second switching devices to actuate the first switching arrangement when the load current is below a lower current bound below the reference current, (ii) for opening both of the switching devices to actuate the second switching arrangement when the load current is above an upper current bound above the reference current, and for (iii) ensuring that only one of the switching devices is closed to actuate the freewheel arrangement when the load current rises or falls to the reference current level from outside the lower and upper current bounds, respectively, wherein the switching device that is closed alternates between the first and second switching devices.

In a still further aspect of the invention, a method is provided for controlling the current in a time variable inductive load, the method comprising the steps of: (i) allowing current to increase in the load by closing a first switching device and a second switching device when the load current is below a lower current bound below a reference current level, wherein the lower current bound varies in response to variations in the reference current level; (ii) decreasing current in the load by opening the first and the second switching devices when the load current is above an upper current bound above the reference current level, wherein the upper current bound varies in response to variations in the reference current level; (iii) freewheeling current so that it recirculates through the load and only one of the switching devices when the load current rises or falls to the reference current level from outside the lower and upper current bounds, respectively; and (iv) alternating the switching device used for freewheeling between the first and the second switching device.

In exemplary embodiments, the controller may alternate between switching devices according to switching events or the alternation may be time dependent. The alternation has the benefit of evening up the amount of time for which each device is energized which can lead to neither device being closed for such an extended period of time that the power supply voltage may drop to a level which is insufficient to sustain the safe operation of the switching device. The invention may also be used to avoid one device overheating by spreading the duty in freewheeling between them.

BRIEF DESCRIPTION OF THE DRAWINGS

The apparatus can be put into practice in various ways, some of which will now be described by way of example with reference to the accompanying drawings in which:

FIG. 7(a) is a schematic block diagram of a control circuit according to the present invention;

FIGS. 7(b) and (c) are waveforms of winding current according to the circuit of FIG. 7(a);

FIG. 7(d) is a truth table for the control logic in the circuit of FIG. 7 (a);

DETAILED DESCRIPTION OF THE INVENTION

Figure 1A:
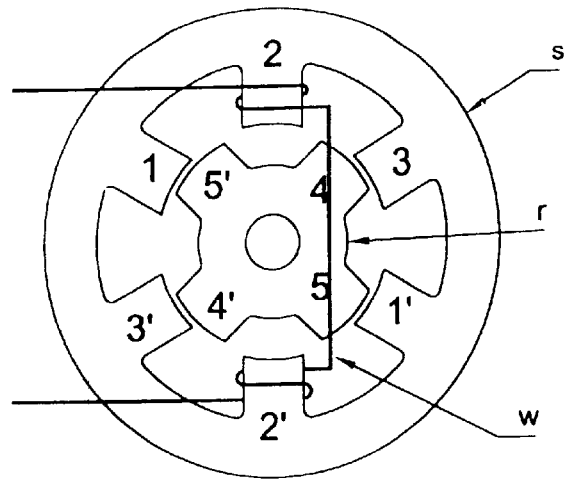
FIG. 1(a) is an end view of a doubly salient switched reluctance machine.

Referring to FIG. 7(a) of the drawings, a current controller for a switched reluctance machine comprises a comparator in the form of a differencing amplifier 10 which receives a demand signal $I_{DEM}$ and a feedback signal $I_{FB}$ and produces an error signal $I_e$ based on the difference between $I_{DEM}$ and $I_{FB}$. An amplifier 11 amplifies the error signal $I_e$. First and second comparators X and Y both receive the amplified error signal $I_e$ at their respective inverting inputs. The first and second comparators each include positive feedback comprising a resistive network formed by serially connected resistors R1 and R2 which are respectively connected between ground potential and one port of an associated solid state analogue switch S1/S2. In this embodiment the analogue switch S1 is a Siliconix DG418 and the analogue switch S2 is a Siliconix DG417. The non-inverting input of each comparator is connected between the resistors R1 and R2. The outputs of the comparators X and Y are connected to control logic 12 which is also fed with a 'phase active' timing signal which enables the outputs of the control logic in accordance with the phase is inductance cycle of the rotor. The control logic can be implemented as a hard wired construction. However, it may be microprocessor-based and possibly part of a larger controller governing the overall SR drive system.

Each of the analogue switches is also connected at a second port with one of a positive and a negative hysteresis voltage $+V_H/-V_H$. The analogue switches S1/S2 are actuated by their respective comparators X and Y. It will be noted that the analogue switch S1 is closed in response to a high output from the comparator X, whereas the analogue switch S2 is closed in response to a low output from the comparator Y.

The outputs from the comparators are also connected with inputs to the control logic 12. The outputs of the control logic 12 are respectively connected with the pairs of power switching devices for a phase winding switch circuit such as that illustrated in FIG. 1(b).

Circuit energization is controlled by considering the current error rather than the absolute value of winding current and essentially exploits the principle of minimum possible action by the use of a controller configuration which uses adjacent hysteresis bands. If the error is within a given band, the phase freewheels. If the error exceeds the band, then appropriate action is taken until the error reaches zero. Freewheeling is then resumed. This is achieved by the use of the two adjacent hysteresis bands which are centred about the desired current level. Each comparator handles one polarity of error, i.e. above and below the desired current level. Swap logic 107 is operably connected with the control logic 12. The function of the swap logic is to alternate between switches for freewheeling a phase. This is described in more detail in relation to FIG. 10 below. In FIG. 7(a) the solid state analogue switches S1 and S2 are used to control the feedback around the analogue comparators X and Y. This operates as follows.

Figure 1B:
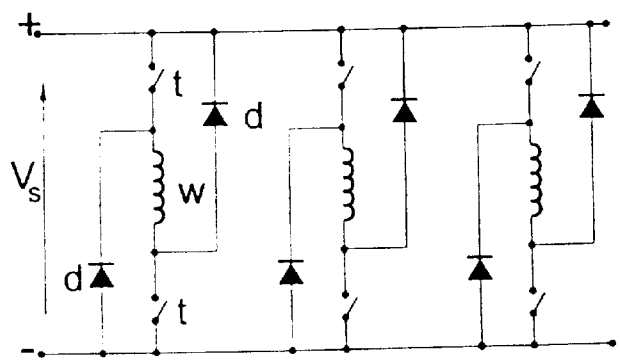
FIG. 1(b) and (c) are circuit diagrams of known switched reluctance machine switching circuits.
Figure 1C:
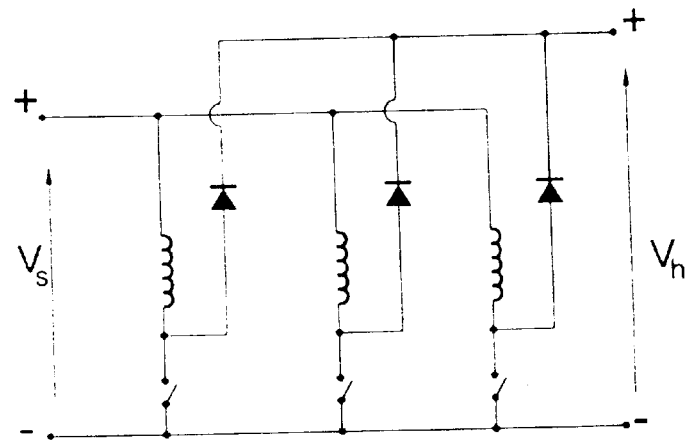
Figure 2A:
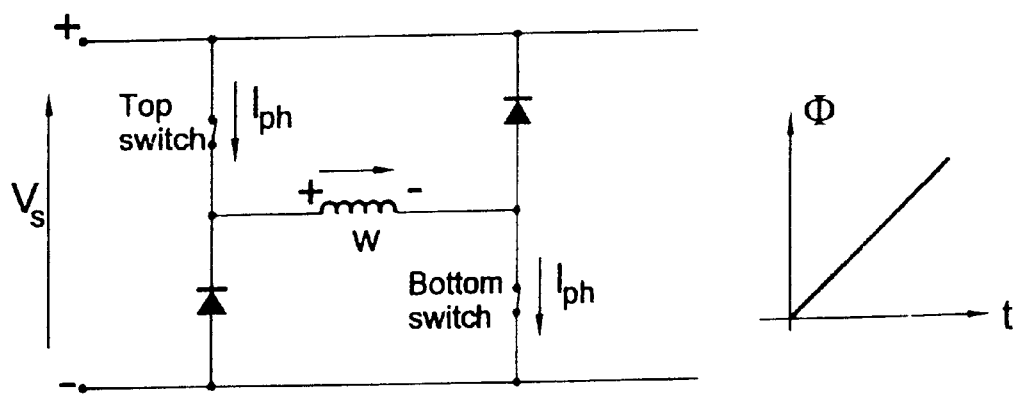
FIGS. 2(a) to (c) are circuit diagrams of the known switching circuits of FIG. 1(b) in its various switched states.
Figure 2B:
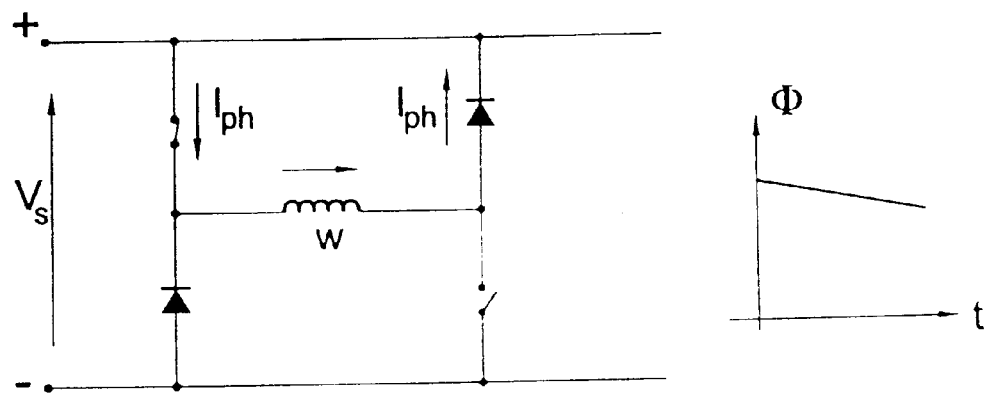
Figure 2C:
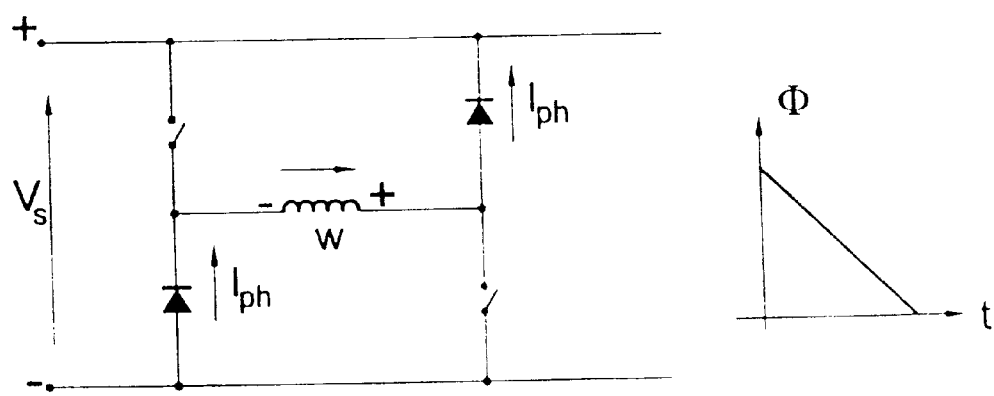
Figure 3A:
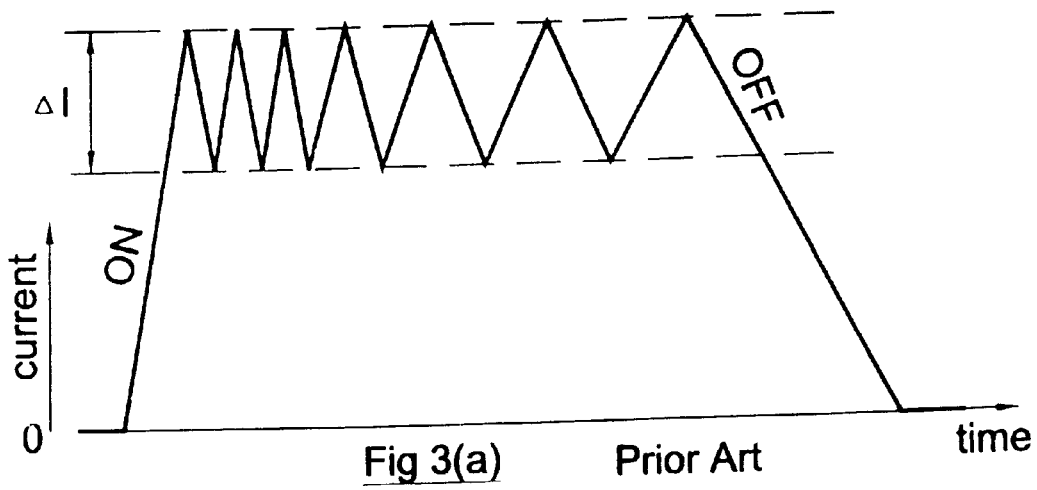
FIGS. 3(a) to (c) are graphs of typical chopping current waveforms.
Figure 3B:
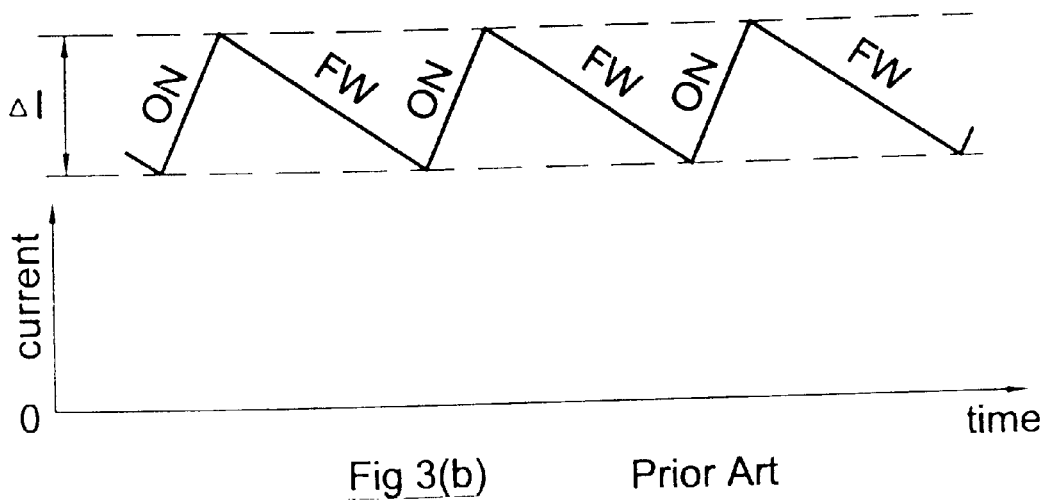
Figure 3C:
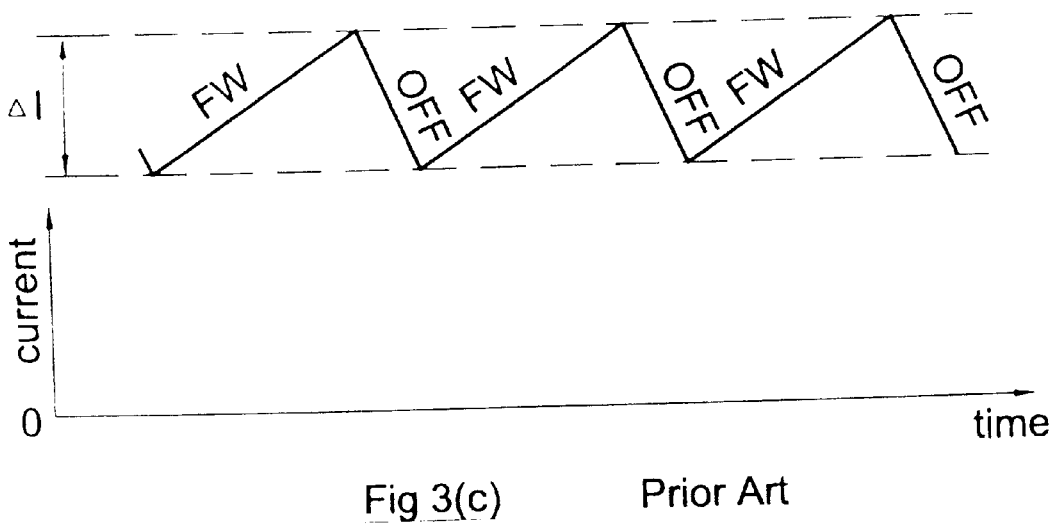
Figure 4:
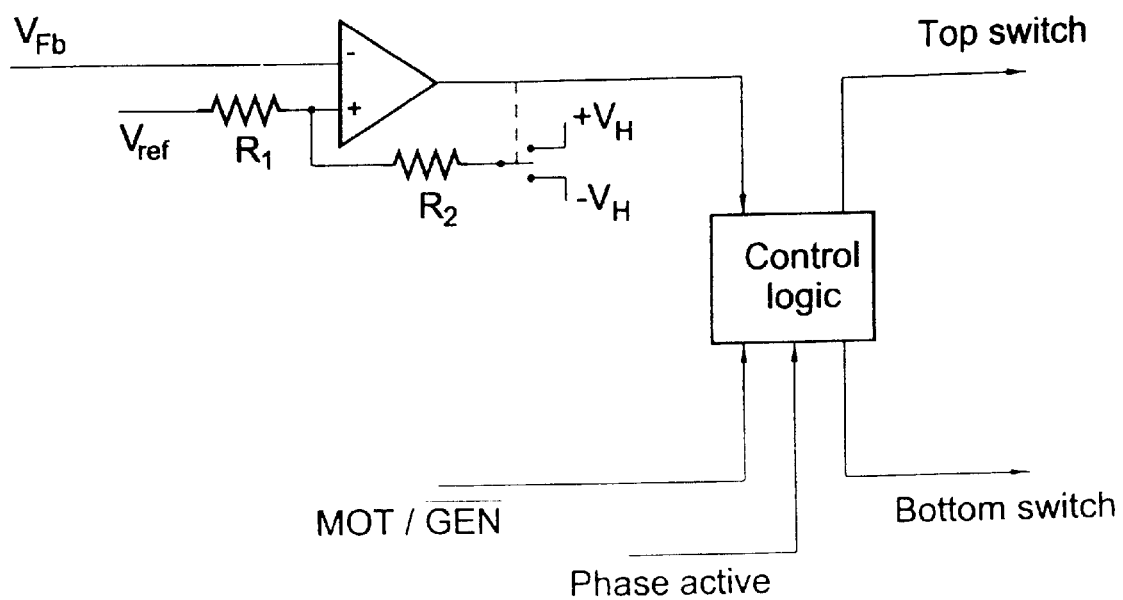
FIG. 4 is a schematic block diagram of a single comparator current controller for a switched reluctance machine.
Figure 5A:
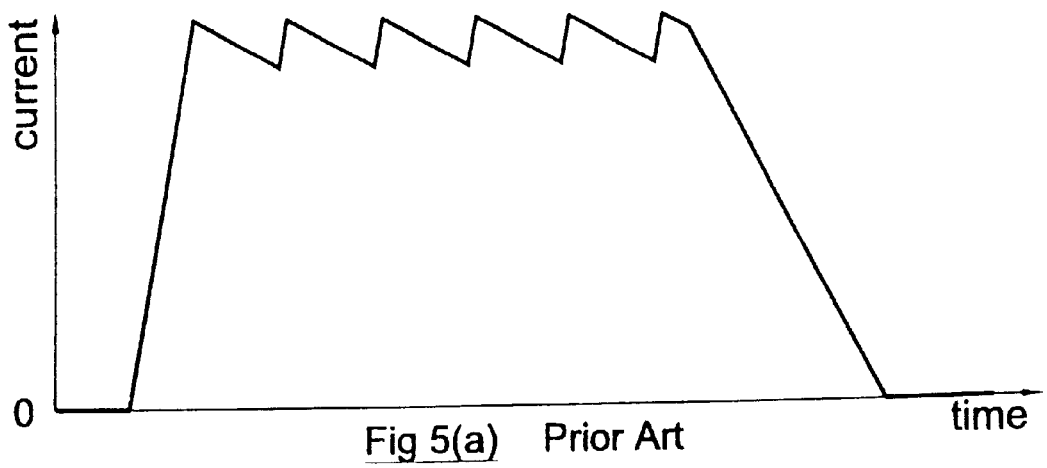
FIGS. 5(a) to (c) are typical waveforms of winding current according to the control applied by the circuit of FIG. 4.
Figure 5B:
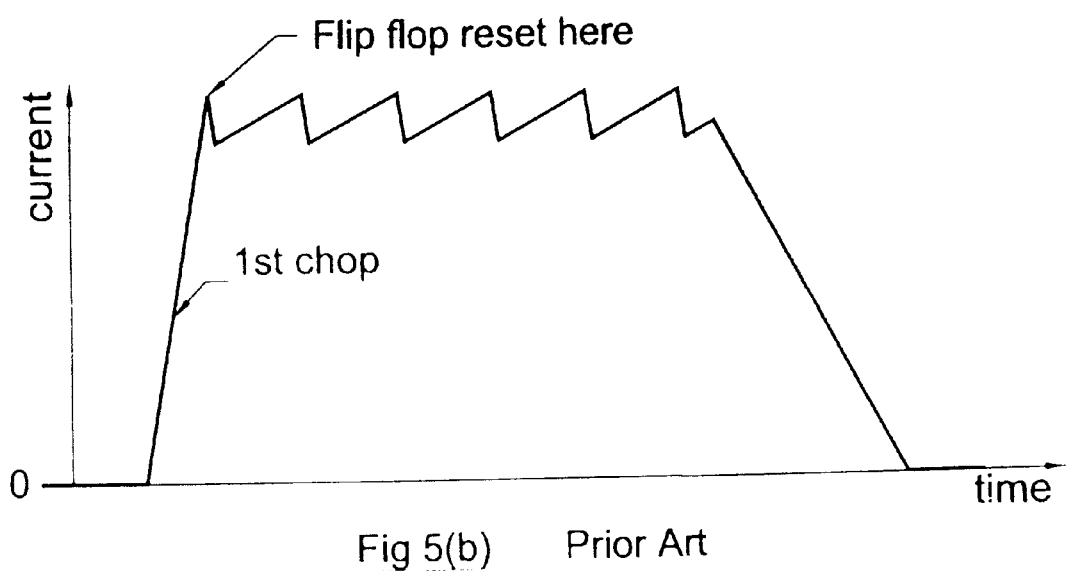
Figure 5C:
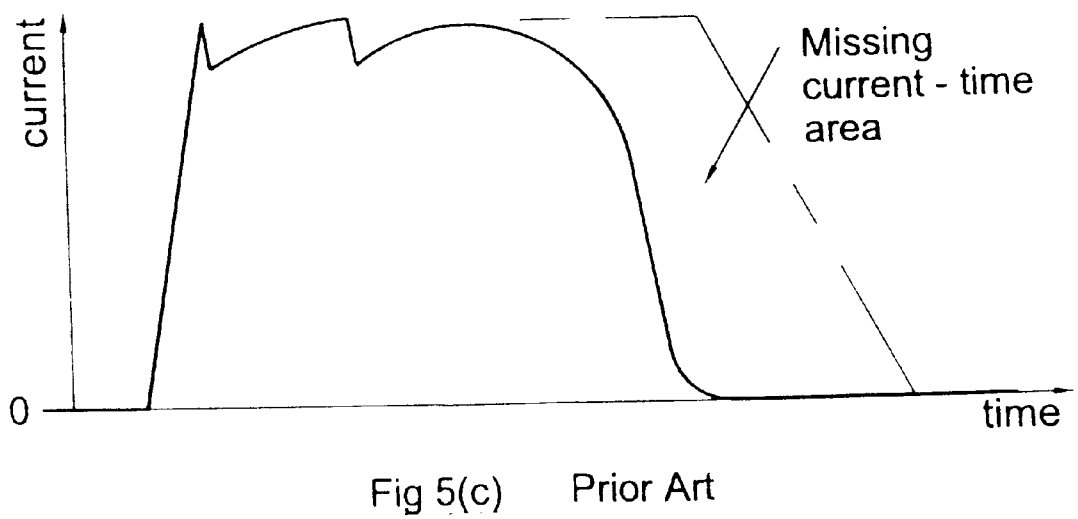
Figure 6A:
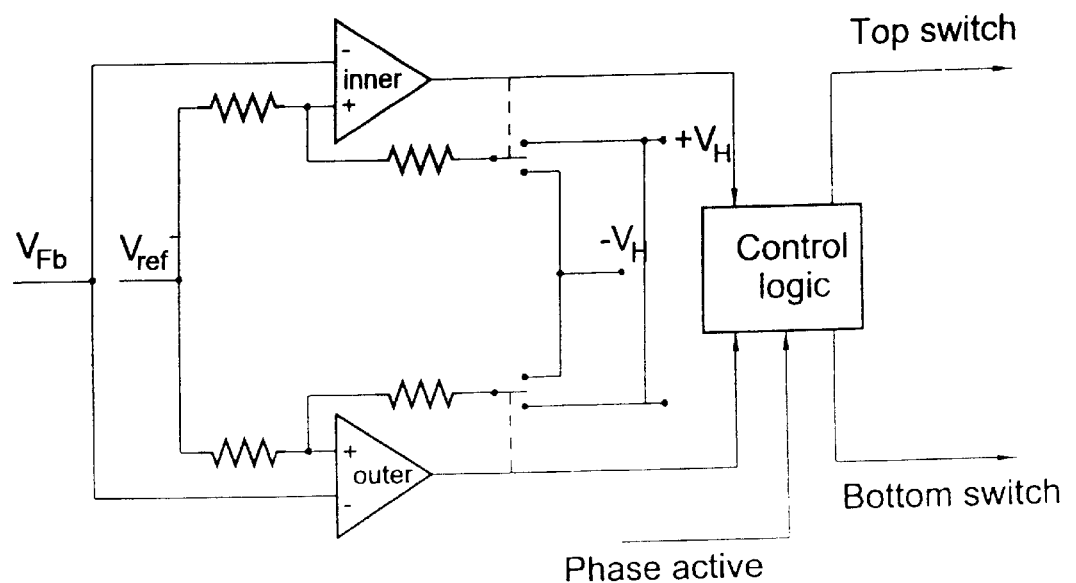
FIG. 6(a) is a schematic block diagram of a dual comparator controller.
Figure 6A:
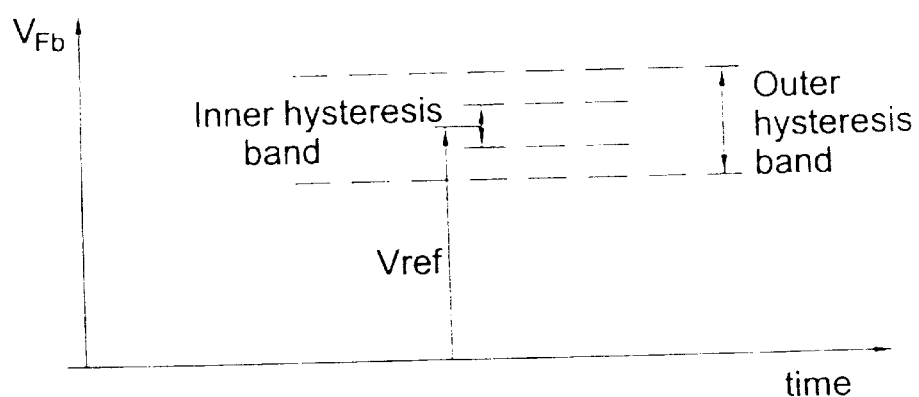
Figure 6B:
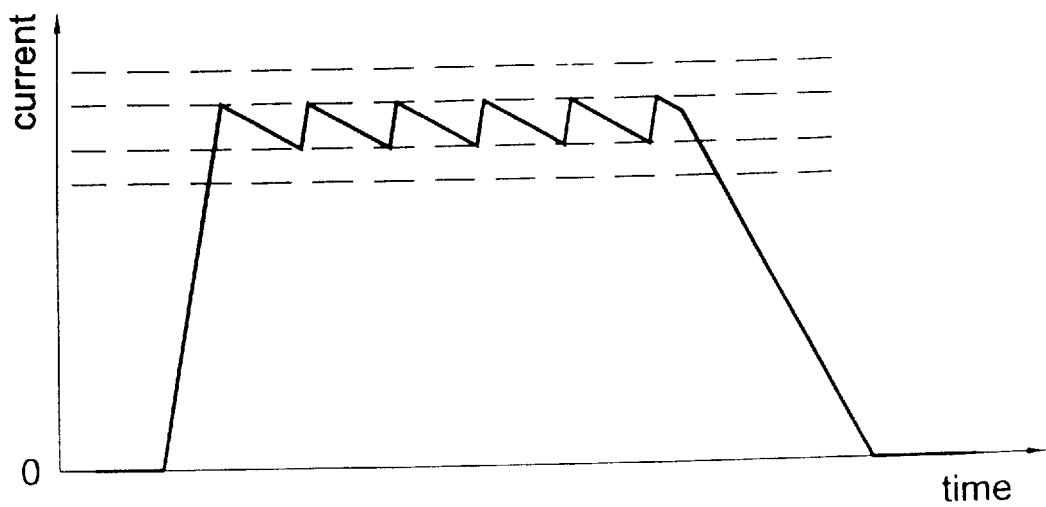
FIGS. 6(b) and (c) are winding current waveforms according to the controller of FIG. 6(a)
Figure 6C:
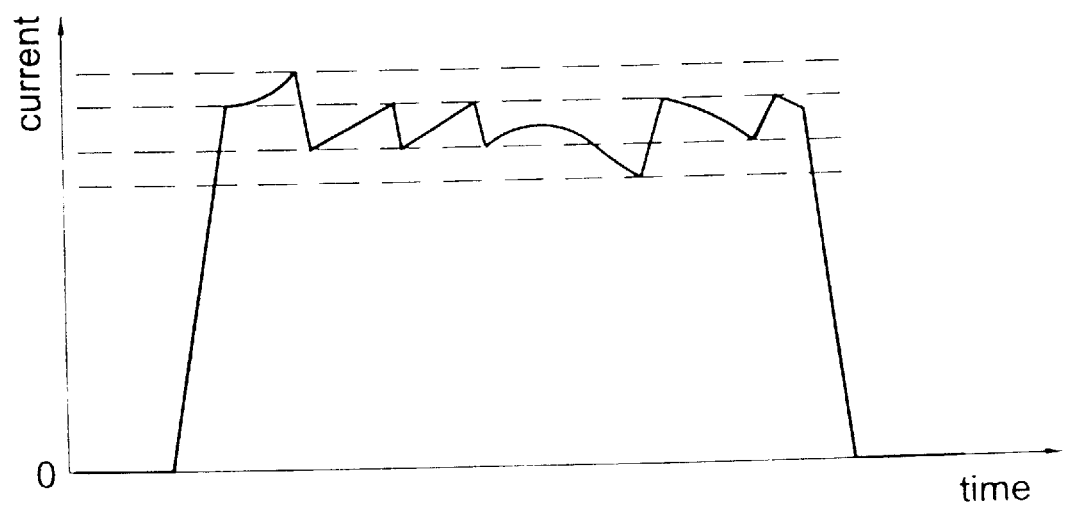

Both comparator outputs will be low whilst there is a large positive error, e.g. whilst the current is rising from zero at the start of a phase period. The comparator Y will have a hysteresis voltage applied via the switch S2, whereas the comparator X has its feedback open-circuited because of the opposite nature in which the switch S1 operates. The comparator X will therefore change state when the current reaches zero error, whereas the comparator Y will not switch until the error signal falls through zero and sufficient negative error is applied to its inverting input. Thus, at the start of a phase period, both comparators are low and the power circuit is in the ON state. Comparator X switches high when the error falls to zero and the phase is made to freewheel by opening either of the top and bottom winding switches t (as depicted in FIG. 1(b)).

If the current now falls (the 'motoring' case) the output of the comparator X will switch low again when the error exceeds the hysteresis value. Chopping will continue between the lower limit of the comparator X and the demanded current level, $I_{DEM}$. This is illustrated in FIG. 7(b).

If, however, the current continues to rise (the 'generating' case), the error, $I_e$, will reverse. The comparator Y will switch should the error become sufficiently negative, i.e. when the current exceeds the upper limit. The power circuit is then switched to the OFF state and will force the phase current down until zero error is reached. The output of the comparator Y then goes low and freewheeling is resumed. Thus, in the generating mode, the current chops between $I_{DEM}$ and the upper limit of the error defined by the hysteresis circuit formed around the comparator Y. This is illustrated in FIG. 7(c).

The behaviour of the circuit is summarized in the truth table of FIG. 7(d). Note that the case of X=0 and Y=1 is theoretically impossible (it implies that the current is simultaneously too low and too high). The power circuits should nevertheless behave predictably if these values occur as a transient error due, for example, to noise. The freewheel state is preferred under this condition, though ON or OFF may also be used.

While the analogue switches S1 and S2 are shown as being actuatable by respectively high and low signals, it will be appreciated that either switch can be substituted for its counterpart as long as an inverter is connected before the actuating input to the analogue switch to invert the output from the relevant comparator X or Y. Similarly, whilst comparators X and Y are shown connected such that their inverting inputs are connected to the error signal, it will be appreciated by those skilled in the art that many combinations of comparator polarity and error polarity are possible (with appropriate decoding in logic block 12) without departing from the intended mode of operation.

The hysteresis circuit illustrated is particularly useful as it allows an analogue hysteresis voltage to be controlled by the two-state output from the comparator by use of the analogue switch. Also, this form of hysteresis circuit is relatively easily adjusted by changing the hysteresis voltage applied. It will be appreciated that an alternative hysteresis circuit can be used to that described. A controller according to the invention may also include means for adjusting the upper and lower hysteresis bands as, for example, a percentage of the speed or torque of the motor or according to any other operating characteristics of the motor to which it is advantageous to link the hysteresis-based control while the machine is running. For example, in the embodiment of FIG. 7(a) the positive and negative hysteresis voltages $+V_H/-V_H$ may be set to a constant predetermined value. While constant $+V_H/-V_H$ voltages provide for effective motor operation, if the width of the hysteresis band remains constant, switching signals will generally be generated more frequently when there is a high current demand signal than when there is a low current demand signal. In order to provide a circuit where the switching frequency of the switching devices is essentially the same regardless of the current demand $I_{DEM}$ alternative embodiments can be realised wherein the hysteresis voltages $+V_H/-V_H$ are not constant but rather vary in proportion to the magnitude of the current demand signal $I_{DEM}$. This also advantageously keeps the magnitude of the current excursions an approximately constant fraction of the total phase current. This variation in the $+V_H/-V_H$ values as a function of the current demand $I_{DEM}$ is particularly beneficial in large motors.

Figure 8:
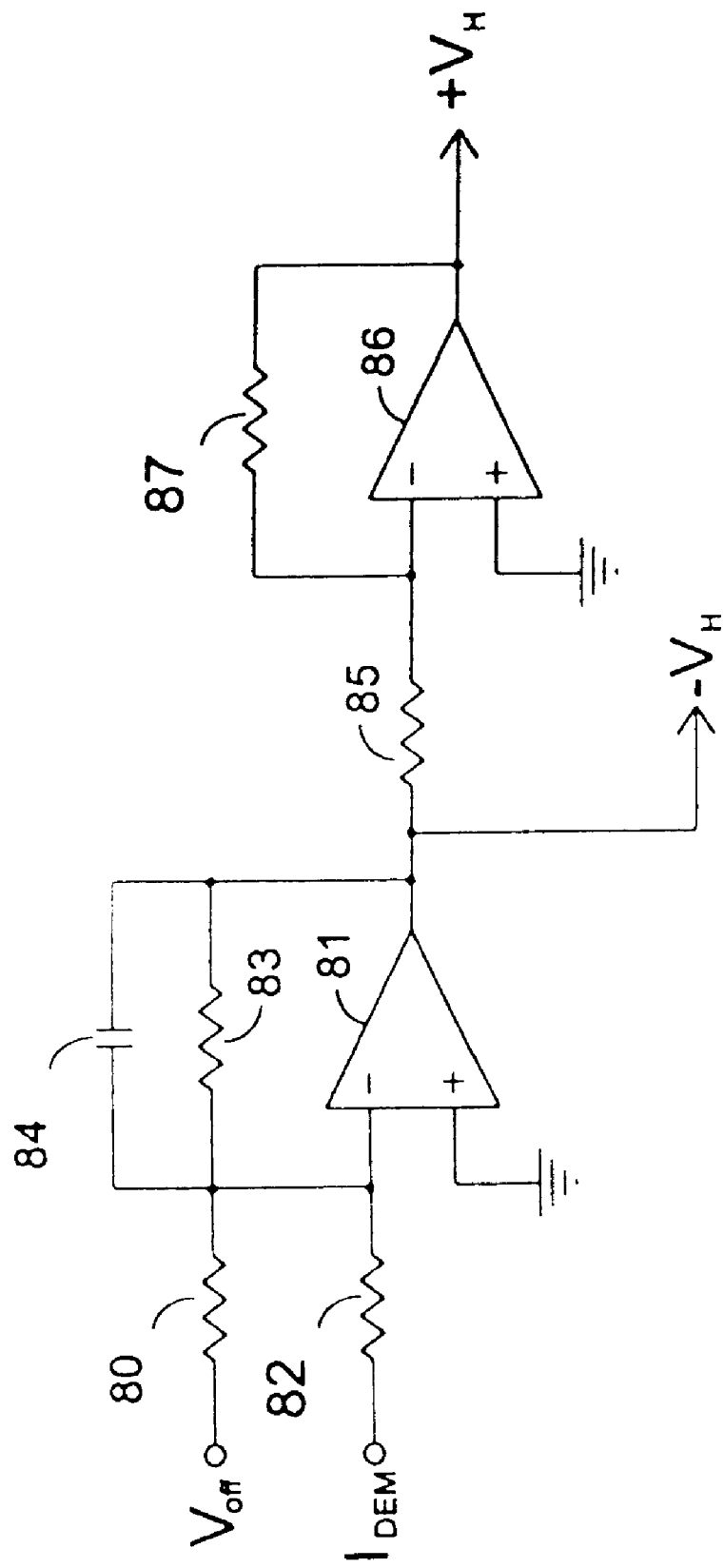
FIG. 8 illustrates an exemplary circuit for providing hysteresis voltages that vary in proportion to the current demand.

FIG. 8 illustrates an exemplary circuit for providing hysteresis voltages $+V_H/-V_H$ that vary in proportion to the current demand $I_{DEM}$ according to the relationship: $(+/-)V_H=V_{off}+KI_{DEM}$ where $V_H$ represents either the upper or the lower hysteresis level; $V_{off}$ represents an offset voltage; K represents a constant multiplication factor and $I_{DEM}$ represents the current demand. Referring to FIG. 8, an offset voltage $V_{off}$ is provided through a resistor 80 to the inverting input of a two input operational amplifier 81. The voltage $V_{off}$ may be provided by a reference voltage generator or any other suitable circuitry. The $V_{off}$ voltage is added to a voltage signal $I_{DEM}$ representing the current demand that is also provided to the inverting input of operational amplifier 81 via resistor 82. The output of amplifier 81 is also coupled to the inverting input via a feedback network comprising resistor 83 and capacitor 84. As those skilled in the art will appreciate, the resistors 80, 82 and 83 and capacitor 84 may be sized such that the output of the operational amplifier 81, $-V_H$, is approximately $V_{off}+KI_{DEM}$, where the value of K is determined by the characteristics of amplifier 81 and the values of resistors 82 and 83. The output of operational amplifier 81, which is the $-V_H$ signal, is applied to the inverting input of a second operational amplifier 86 through resistor 85. Operational amplifier 86, along with feedback resistor 87, inverts the $-V_H$ signal and provides a $+V_H$ signal at its output. The $+V_H$ and $-V_H$ signals may then be provided to the circuitry of FIG. 7(a).

While FIG. 8 illustrates the circuitry for generating $+V_H/-V_H$ signals that vary with $I_{DEM}$ for a single phase of a potentially multi-phase motor, it will be understood that in multi-phase motors the circuitry of FIG. 8 could be repeated with each phase receiving its own $I_{DEM}$ signal. In general, the offset voltage $V_{off}$ will be the same for all of the phases.

The controller according to the invention keeps control of current under all conditions, even when braking at low speeds. Further it eliminates the need for nested hysteresis bands, so avoiding the associated difficulties referred to. It has no large transient errors and gives consistent predictable performance over the entire working current range of a given machine.

Throughout this description a conventional two switch per phase (i.e. a dual-switch forward converter) power circuit, such as depicted in FIG. 1(b), has been assumed. The principles discussed are, however, equally applicable to any circuit which allows the motor winding current to freewheel, i.e., when the winding voltage is kept close to zero and the associated magnetic flux is therefore approximately constant.

Figure 9A:
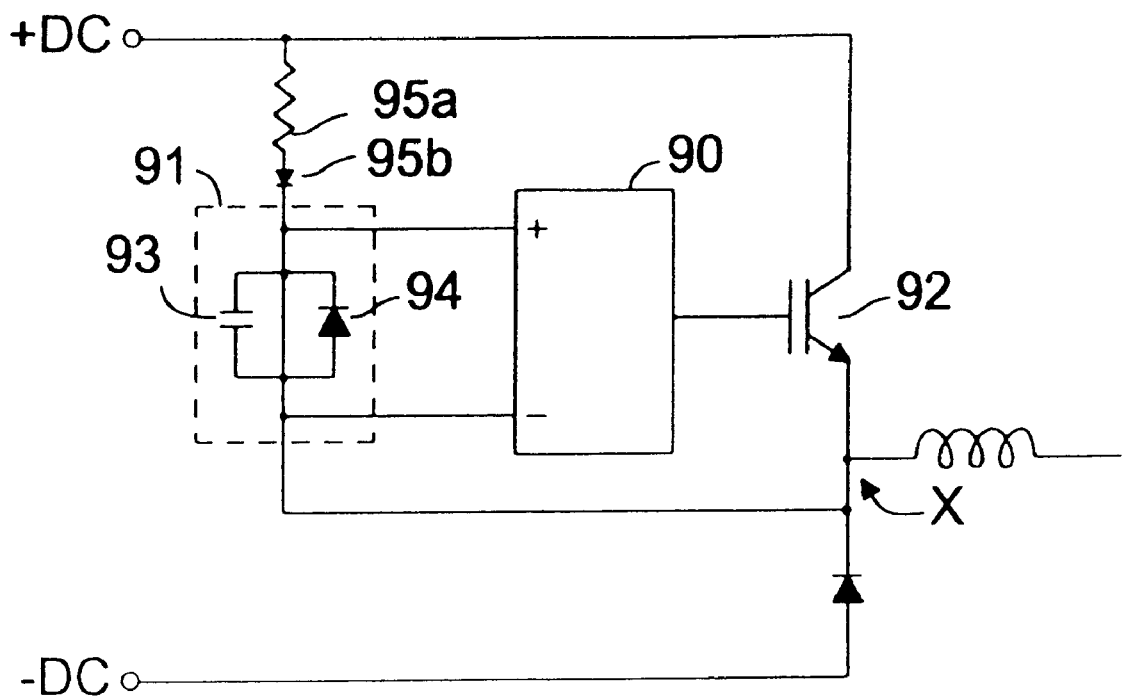
FIG. 9(a) generally illustrates a gate drive circuit and gate drive circuit power supply suitable for use with the present invention.

In switched reluctance motors because the point where the switching device couples to the phase winding often has significant voltage swings it is often necessary to provide a specialized power supply for the gate drives that control the switching of the power devices. FIG. 9(a) generally illustrates a gate drive circuit 90 and a gate drive circuit power supply 91 which may be used with the present invention. In FIG. 9(a), the gate drive controls a power switching device 92 that is coupled to a phase winding. Another switching device, including a gate drive and power supply, is also coupled to the phase winding (not shown in FIG. 9(a)).

In the embodiment of FIG. 9(a), power switching device 92 is an insulated gate bipolar transistor (IGBT) that has its collector coupled to the positive terminal (+DC) of a DC bus and its emitter coupled to the phase winding. Accordingly, when switching device 92 is switched on, the phase winding will be coupled to the +DC bus line.

Referring to FIG. 9(a), the gate drive of the present circuit is powered by a power supply 91 that derives its power from the collector to emitter voltage differential of the switching device 92 when the switching device 92 is OFF. In FIG. 9(a), power supply 91 comprises a capacitor 93 and a voltage regulator 94, which may be a zener diode. One terminal of both capacitor 93 and diode 94 is coupled to one end of a bleed resistor 95a either directly or through an optional diode 95b, as shown. The other end of the bleed resistor 95a is coupled to the positive terminal (+DC) of a DC bus. The terminals of the capacitor 93 and the diode 94 not coupled to the bleed resistor 95a are coupled to the point where the switching device 92 couples with the phase winding (node X). In operation, when switching device 92 is open, the lower terminal of capacitor 93 will be coupled to either the negative rail –DC of the DC bus (when the return diode is conducting) or will typically be at a potential approximately mid-way between +DC and –DC nodes. In either case, charge will flow through bleed resistor 95a and charge up capacitor 93 such that a voltage differential appears across the terminals of the capacitor 93. This voltage differential is applied to the gate drive 90 such that capacitor 93 and diode 94 form a power supply for supplying a DC voltage to the gate drive that is referenced to the node X where the switching device 92 is coupled to the phase winding.

In general the value of capacitor 93 should be large enough to avoid a significant voltage "sag" over the longest envisioned conduction period of the switching device 92. As discussed below, the switching of switching device 92 may be controlled to regulate the conduction periods of switching device 92 so as to limit the required size of capacitor 93.

Figure 9B:
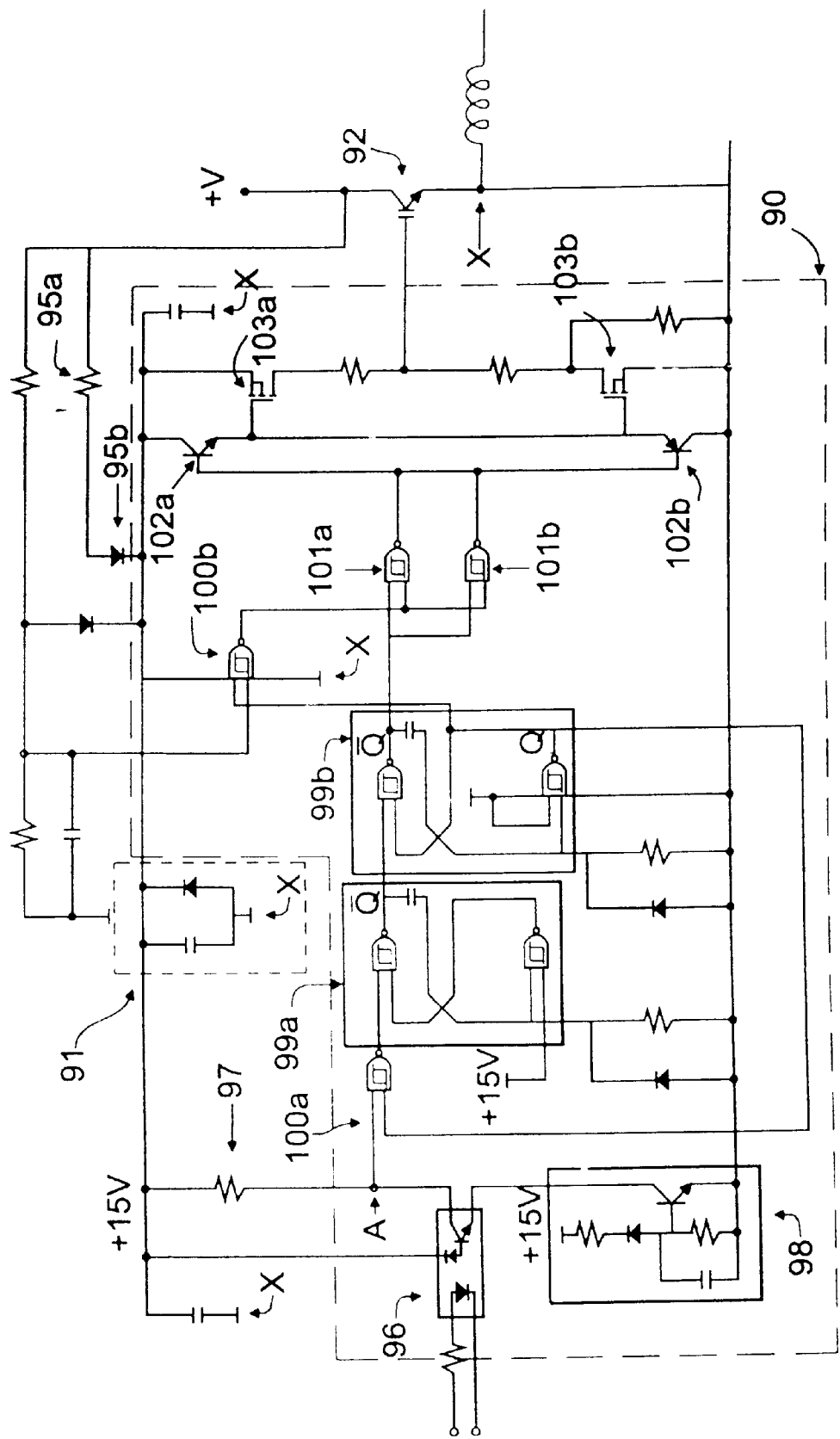
FIG. 9(b) illustrates in greater detail the gate drive circuit and power supply of FIG. 9(a)

FIG. 9(b) illustrates in greater detail power supply 90 and gate drive circuitry 91 in accordance with the present invention. Referring to FIG. 9(b), the power supply 91 is illustrated, comprising a zener diode 94 and a capacitor 93. The positive terminal of power supply 91 is coupled to the positive rail of a DC bus via a bleed resistor 95a; the negative terminal of power supply 91 is coupled to the node X where switching device 92 is coupled to the phase winding. When the switching device 92 is open, a bleed current will flow from the positive rail of the DC bus through bleed resistor 95a and will begin to charge capacitor 93 to a voltage level that is approximately that of the breakdown voltage of zener diode 94. In the embodiment of FIG. 9(b), the breakdown voltage of the zener diode 94 is approximately 15 V. Accordingly, when the switching device 92 is open, the capacitor 93 will remain charged to approximately the breakdown voltage of the zener diode and power source 91 will provide a voltage differential across its positive and negative terminals equal to the voltage across capacitor 93.

The voltage from power supply 91 is used to power gate drive circuit 90. As illustrated in FIG. 9(b), gate drive circuit 90 includes an opto-isolator 96 that receives signals from the motor control circuitry (not shown). For purposes of explanation, the output of opto-isolator 96 is designated node A in FIG. 9(b). Opto-isolator 96 is provided to separate the high voltage devices which form the power supply 91, gate drive 90 and switching device 92 from the low-voltage, lowpower devices that form the motor control circuitry. The opto-isolator 96 also permits the common mode potential (i.e., the potential of the gate driver "0 V" rail, node X, with respect to the power circuit) to swing through many hundreds of volts as the associated switching device 92 opens and closes.

In operation, the signals applied to opto-isolator 96 are inverted by a network comprising a resistor 97 and undervoltage detector 98. Undervoltage detector 98 comprises a transistor whose base is coupled to a resistor/zenerdiode series connected arrangement that is coupled to the positive and negative terminals of power supply 91. When the voltage provided by power supply 91 is of a sufficient magnitude to allow gate drive 90 to function properly, the transistor is biased on. When the transistor in undervoltage circuit 98 is biased on, a logic high signal applied to the opto-isolator 96 will drive node A to the negative potential of the terminal of power supply 91. Similarly, when the transistor in undervoltage circuit 98 is biased on, a logic low signal applied to opto-isolator will allow resistor 97 to pull the voltage at node A to the positive voltage provided by power supply 91.

In the event that the voltage provided by power supply 91 is below the level required to drive the gate drive circuit (11 volts in the example of FIG. 9(b)) the transistor in undervoltage circuit 98 will be biased off. When the transistor 98 is biased off, the voltage at node A will remain at the voltage level of the positive terminal of power supply 91 thus turning off switching device 92, regardless of the level of the signal applied to opto-isolator 96. This protects switching device 92 from unsafe attempts to close it when insufficient voltage is available from the power supply 91.

The voltage at node A (which is controlled by the input to opto-isolator 98 when the power supply is properly charged) is applied to two falling edge-triggered monostable multivibrator circuits 99(a) and 99(b). In general, these monostable multivibrator circuits 99(a) and 99(b) ensure that the gate drive signal applied to the switching device 92 has both a "minimum-on time" and a "minimum-off" period between successive on-times.

Referring to FIG. 9(b), the first monostable multivibrator 99(a) provides the "minimum-off" time between successive on-times of the switching device 92. This aspect of the circuitry is initiated in response to the occurrence of a "high" logic state at the output of opto-coupler 96. In the circuitry of FIGS. 9(a) and 9(b), the occurrence of a logic "high" at the output of the optocoupler 96 (i.e., node A) indicates that the switching device 92 should be switched OFF and the occurrence of a logic "low" at the output of the opto-coupler 96 indicates that the switching device 92 should be switched ON.

The basic operation of monostable multivibrators 99(a) and 99(b) is generally understood and is not discussed herein in detail. In general, however, the occurrence of a logic high signal at the input of opto-isolator 96 indicates that switching device 92 should be switched ON. The occurrence of the logic "high" signal at the input of the opto-isolator 96 drives the output of the opto-isolator low, causing the input to the first monostable multivibrator 99(a) also to go low. This causes the output of the first monostable multivibrator 99(a) to transition from a logic high level to a logic low level. This falling edge at the output of the first edge-triggered monostable 99(a) is used to trigger the second monostable 99(b), such that the output of the second monostable 99(b) transitions to a high logic level and remains at the high logic level for at least the period of the edge triggered monostable 99(b), regardless of any changes in the input to or the output from the optoisolator 96. At the same time the inverting output of the monostable 99(b) is held high for a predetermined period of time, the non-inverting output of the monostable 99(b) goes low and remains low for the predetermined time period. This logic low output signal is applied as one input to NAND gates 100a and 100b. The other input to NAND gate 100a is the output of the optoisolator 96. Thus, through NAND gate 100a, the logic low signal from the non-inverting output of monostable 99(b) locks out the opto-isolator signal for the predetermined period of time and also disables the undervoltage detection circuit 98 for the same time period. In this manner, the monostable 99(b) ensures that when the switching device 92 is switched ON it remains on for a predetermined period of time regardless of noise at node A or on the power supply 91. Through NAND gate 100b the logic low signal from monostable 99(b) locks out the excessive $V_{CE}$ circuit discussed below.

The inverting output of the monostable 99(b) will remain high (and switching device 92 will remain ON) as long as the input signal to the opto-isolator 96 remains logic high. When the input to opto-isolator 96 transitions to logic low (or is removed), the output of the opto-isolator 96 will transition from logic low to logic high, and, provided the minimum-ON time has elapsed, will cause the output of NAND gate 100a to transition from logic high to logic low. This transition of the input to monostable 99(a) from logic high to logic low triggers monostable 99(a) and provides a minimum-OFF time for switching device 92.

Referring again to FIG. 9(b), when the input to monostable 99(a) transitions from logic high to logic low, the inverting output from monostable 99(a) will transition from logic low to logic high and will remain logic high for a predetermined time period determined by the period of monostable 99(a). This high output from monostable 99(a) is applied to the input of monostable 99(b) and ensures that the inverting output of monostable 99(b) remains logic low (i.e., switching device 92 remains OFF) at least as long as the output of monostable 99(a) is held logic high. In this manner, monostable 99(a) provides for a minimum-OFF time between on times of switching device 92. Provided the minimum-OFF time has expired, the inverting output of monostable 99(b) will transition from logic low to logic high to turn ON switching device 92 if and when the input to opto-isolator 96 is again driven logic high.

The minimum-ON and minimum-OFF periods serve several functions. First, they restrict the switching frequency of the switching device 92 to a safe value. Second, they force the gate drive circuit to ignore interference or noise which may appear at the output of the opto-coupler as a result of the switching of the switching device 92. The minimum-ON monostable 99(b) also serves a third purpose. As illustrated in FIG. 9(b), the non-inverting output of the monostable 99(b) is applied as a first input to NAND gate 100b. A second input to NAND gate 100b receives a signal derived from the collector-emitter voltage of switching device 92. In operation, the second input of NAND gate 100b monitors the collector-emitter voltage of the switching device 92 ($V_{CE}$). Should the $V_{CE}$ of the switching device 92 exceed a given level when the switching device 92 is switched ON it is assumed that the switching device 92 has come out of saturation due to a fault (e.g., a short circuit). In the event that the $V_{CE}$ of the switching device 92 exceeds a predetermined level (selected depending on the characteristics of the particular switching device) when the switching device is switched ON, the second input of NAND gate 100b will rise to a logic high level, thus forcing the output of NAND gate 100b logic low. This will force the output of NAND gate 100b low, thus turning OFF switching device 92.

While the above-described method of detecting faults in the drive circuit and disabling the switching device 92 in the event of an excessive $V_{CE}$ provides a measure of fault protection for the system, the $V_{CE}$ of the switching device 92 is naturally high (potentially several hundreds of volts) when the switching device 92 is turned OFF. The protective mechanism provided by NAND gate 100b must therefore be disabled when switching device 92 is initially closed, typically for the first few microseconds of on-time as the $V_{CE}$ of the switching device 92 drops from this high level to a normal level. By providing the non-inverting output of monostable 99(b) to the first input of NAND gate 100b, the monostable 99(b) disables the protection provided by NAND gate 100b for a few microseconds after the switching device 92 is switched ON.

The output of monostable 99(b) is applied to NAND gates 101a and 101b and a set of series connected bipolar transistors including an upper NPN transistor 102a and a lower PNP transistor 102b and a set of series connected MOSFETs including a upper n-channel MOSFET 103a and a lower p-channel MOSFET 103b. In operation, the inverting output of monostable 99(b) is applied to as a first input to NAND gates 101a and 101b. The output from the protection circuit including NAND gate 100b is applied to the second input of NAND gates 101a and 101b. As discussed above, the output of NAND gate 100b is normally logic high except when an excessive $V_{CE}$ of switching device 92 is detected. When the inverting output of monostable 99(b) is a logic high (i.e., close to the voltage on the positive terminal of power supply 91) the gate drive will activate or turn-ON the switching device 92. This is because in such instances, the lower transistor 102b and upper MOSFET 103a will be rendered conductive, thus providing a positive voltage gate signal to the gate of switching device 92 and turning on switching device 92. When the inverting output of monostable 99(b) is logic low (i.e., close to the voltage provided at the negative terminal of power supply 91) the upper transistor 102a and lower MOSFET 103b will be rendered conductive, substantially removing the voltage applied to the gate of switching device 92, thus turning switching device 92 off.

The gate drive circuitry of FIG. 9(b) is but one example of a gate drive circuit that may be combined with the present invention. In general, the power supply may be used with any gate drive circuit that requires voltage source references.

Referring to FIGS. 9(a) and 9(b), it may be noted that when the switching device 92 is switched on there is a net drain of energy from capacitor 93 and the voltage available from the power supply 91 will decrease. In order to prevent the voltage available from the power supply 91 from dropping too low, it is necessary to control the switching signals for the power devices such that the power supplies 91 associated with the power devices can provide the required voltage when necessary.

Figure 10:
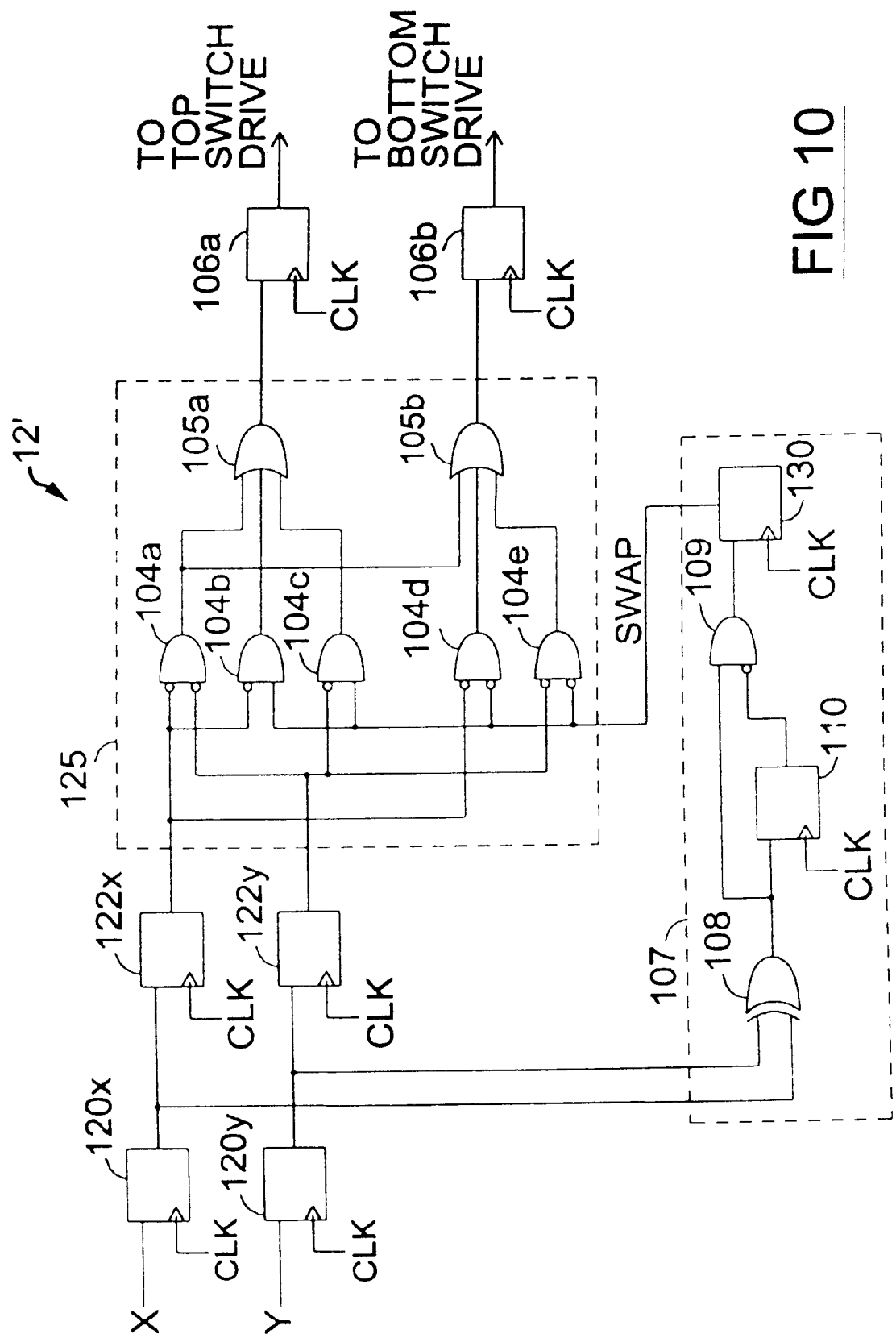
FIG. 10 illustrates a control system for a switched reluctance machine that alternates the switching device used to introduce freewheeling during motor operation.

By means of the SWAP circuit 107 in FIG. 7(a), the voltages available from the power supplies 91 are maintained at an acceptable level by alternating the switching device used to introduce freewheeling during motor operation. The SWAP circuit 107 is shown in FIG. 10. Controller 12' of FIG. 10, like controller 12 of FIG. 7(a), receives the outputs from comparators X and Y and provides signals to the drive circuits for the top and bottom power devices. As discussed more fully above and indicated by truth-table 7(d), comparators X and Y compare the current error to positive and negative hysteresis levels $+V_H$ and $-V_H$ and provide output signals to controller 12 that cause controller 12 to: (i) close switching devices when X=0 and Y=0, (ii) introduce a freewheeling period whenever X=0 and Y=1 (a condition that should not occur in normal operation) or X=1 and Y=0 by opening one of the switching devices; and (iii) open both switching devices whenever X=1 and Y=1. The controller 12' of FIG. 10 receives the signals from the comparators and implements the functionality of the truth-table such that the switching device used for freewheeling alternates for each change in state of the outputs of comparators X and Y. In this manner, the switching devices are each opened and closed for equal periods, thereby ensuring that neither switching device has to be closed for a period of time sufficient to cause the voltage available from the power supply to drop to an unacceptable level. Furthermore, the average collector-emitter potential, used to feed power supply 91, is advantageously made equal for both gate drive circuits. Also, the current flowing in each switching device is equal, thereby ensuring balance of conduction (on-state) losses in the two switching devices associated with each phase winding.

Referring to FIG. 10, controller 12' includes two clocked flip-flops 120x and 120y that receive the outputs from comparators X and Y respectively. The clocked output of flip-flops 120x–y are applied to the data inputs of a second set of clocked flip-flops 122x and 122y. The outputs of flip-flops 122x–y are applied as the inputs to a decoder circuit 125. Decoder circuit 125 comprises five AND gates 104a–e and two triple input OR gates 105a–b. Decoder circuit 125 may be implemented through the use of discrete logic components, an ASIC, PLA or programmed microprocessor or microcontroller. The outputs of decoder circuit 125 are applied to a third set of clocked flip-flops 106a–b. The outputs from flip-flops 106a and 106b are applied to the driver circuits for the power switches, such as circuit 90 of FIGS. 9(a) and 9(b), and control the state of the power devices.

From an analysis of FIG. 10, it is clear that the decoder circuitry 125 implements the truth table of FIG. 7(d). When the outputs of both comparators X and Y are logic low, the output of AND gate 104a will be logic high, forcing the outputs of OR gates 105a and 105b both high, turning on both the top and the bottom power switches. In a similar manner, when the outputs of comparators X and Y are both logic high, the outputs of the AND gates 104a–e will all be logic low, rendering the outputs of OR gates 105a and 105b both low, turning off the top and bottom power devices. Further, when the outputs from comparators X and Y are one logic high and the other logic low (i.e., in the freewheeling state) the decoder circuitry 103 ensures that the output of exactly one AND gate 104 will be logic high, turning on one of the switching devices and leaving the other switching device closed for freewheeling.

In the embodiment of FIG. 10, the specific AND gate 104 whose output will be logic high when X and Y are in the freewheel state depends on the state of the SWAP signal produced by the SWAP circuit 107. In general, when the SWAP signal is logic high and X and Y are in the freewheel state AND gates 104b–c will be enabled (thus turning on the top switching device) and AND gates 104d–e will be disabled (thus turning off the bottom switching device to allow freewheeling). In a similar manner when SWAP signal is logic low, AND gates 104b–c will be disabled (turning off the top switching device) and gates 104d–e will be enabled (thus turning on the bottom switching device).

The SWAP signal is generated by SWAP circuit 107. In general, SWAP circuit 107 receives the outputs from the comparators X and Y from flip-flops 120x and 120y and produces a SWAP signal that changes state with each change in state of the outputs from comparators X and Y.

Referring to FIG. 10, SWAP circuit 107 receives the outputs from flip-flops 120x and 120y and applies them to XOR gate 108. Because the output of only one of the comparators X or Y will change at any given time, the output of XOR gate 108 will change state for each change in state of the outputs of comparators X and Y. The output of XOR gate 108 is directly applied as one input to AND gate 109. The other input to AND gate 109 is the inverted output of a flip-flop 110 which corresponds to the output of XOR gate 108 delayed by one clock cycle.

As those skilled in the art will recognize, the combination of the flip-flop 110 and the AND gate 109 form an edge-detector that provides a clock pulse each time the output of XOR gate 108 transitions from logic low (0) to logic high (1). Such a change in state of the output of XOR gate 108 would correspond to the change in state of the power devices from a state of either both on or both off to a freewheeling state. Accordingly, each time the outputs of comparators X and Y indicate that the power devices should transition from ON to freewheeling or from OFF to freewheeling, a clock pulse will be generated by AND gate 109.

The output of AND gate 109 is applied to the T input of a clocked toggle (T) flip-flop 130. The output of T flip-flop 130 is the SWAP signal and it is applied to AND gates 104b–e to control the power device used for freewheeling as described above. T flip-flop 130 operates as a conventional clocked T flip-flop and produces an output signal that is constant whenever T is 0 but that changes from 0 to 1 or 1 to zero each time T changes from 0 to 1. Accordingly, the output of T flip-flop 130 (the SWAP signal) will toggle from 0 to 1 or vice versa in response to each clock pulse from AND gate 109. In this manner, the power device that will remain closed for freewheeling will alternate upon each change in state of the outputs of comparators X and Y from the top switching device to the bottom switching device.

While the circuitry of FIG. 10 was discussed in the context of using alternate power devices for freewheeling to ensure that the power supplies 91 for the gate drives are properly energized, it may be used to implement alternate freewheeling for other purposes. For example, if the same power device were used for freewheeling for a number of consecutive cycles, losses associated with the freewheeling currents flowing through the power device could cause the temperature of the power device to rise, possibly degrading the performance or life of the power device. By using alternate freewheeling in accordance with the present invention, such temperature or heat problems may be reduced.

While the embodiment of FIG. 10 is beneficial in that it alternates the power device that is closed during freewheeling periods from the top device to the bottom device, it does not necessarily ensure that the power supplies 91 of the present invention will always be properly energized. For example, in the embodiment of FIG. 10, depending on the operating characteristics, there exists a possibility that successive changes in state of the comparators X and Y that produce changes in state of the SWAP signal will not occur with the necessary frequency to keep the power supplies 91 properly energized. In accordance with another embodiment of the present invention, a timer is used to sense the time that has occurred after each change in state of the outputs of the X and Y comparators. If a change in state has not occurred after a predetermined time period, the timer will initiate a change in state of the SWAP signal, thus forcing a commutation that alternates the power device used for freewheeling.

Figure 11:
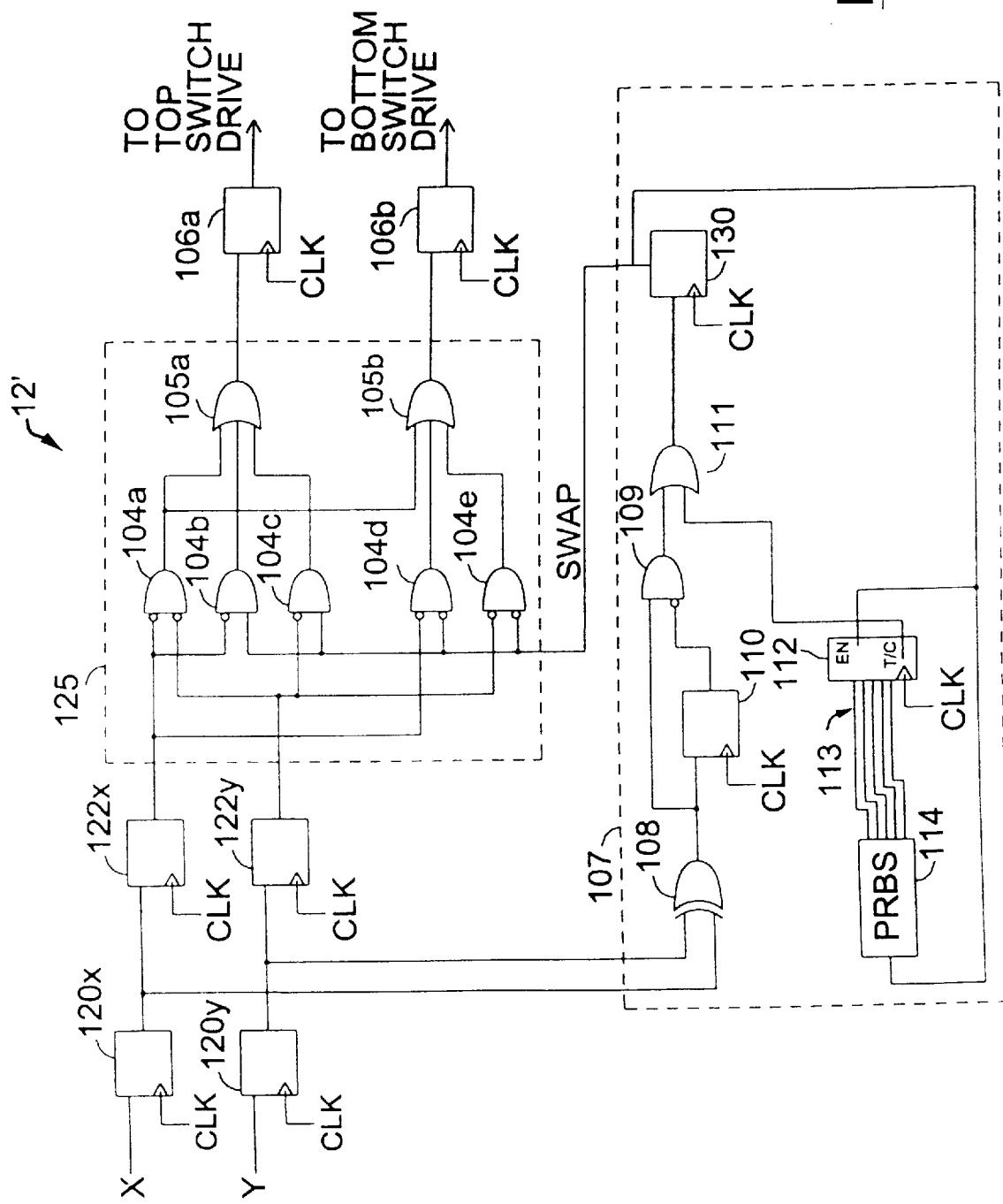
FIG. 11 illustrates a control system for a switched reluctance machine that alternates the switching device used to introduce freewheeling during motor operation and forces a commutation of the switching device if one does not naturally occur within a predetermined time period.

One example of an embodiment of the present invention where a timer is used to force commutation if commutation does not naturally occur is illustrated in FIG. 11. The circuitry of FIG. 11 is similar to the circuitry of FIG. 10 with the exception that an OR gate 111 and a counter 112 have been added to the SWAP circuit 107. OR gate 111 receives the output from AND gate 109 and will pass the clock pulses provided by gate 109 to T flip-flop 130 to initiate a forced commutation from the top power device to the bottom power device as described above. The output of T flip-flop 130 is also applied to the ENABLE input of counter 112. Each time a clock pulse is received at the ENABLE input of counter 112, counter 112 loads the digital word appearing at its DATA input 113 and begins to count up upon the occurrence of each clock pulses at its CLK input. When counter 112 has reached its maximum count it will generate a logic high signal at its terminal count (TC) output. The signal at the TC output of counter 112 is also applied to OR gate 111 such that a 0–1 transition occurs at the output of OR gate 111 (and thus a change in state of the SWAP signal) each time the TC output of counter 112 transitions from 0–1. Because the output of T flip-flop 130 is applied to the ENABLE input of counter 112, each time the TC output of TC goes high, the counter will be effectively reset upon the next CLK pulse and the cycle will begin to repeat.

In operation, the counter 112 monitors the change in state of the SWAP signal and forces a change in state of the SWAP signal if no change has occurred after a predetermined time period. In operation, the predetermined time period is determined by the value of the digital word applied to the DATA input 113 of counter 112.

Although embodiments are possible wherein the digital word applied to the DATA input 113 of counter 112 is constant (e.g., a forced commutation occurs every 16.4 msec), it may be desirable to vary the data word in a pseudo-random fashion. This is because if, in operation, the chopping frequency (i.e., the frequency at which the outputs of comparators X or Y change) is close to the frequency defined by the data word, a beating effect may occur. When beating occurs, any first commutation of the power devices (either because of a maximum count from counter 112 or from a change in state of the X or Y comparators) will be quickly followed by a second commutation. The second commutation will cause the SWAP signal to change to the state it was before the first commutation, essentially "undoing" the effect of the first commutation. This beating effect can result in one power device "hogging" the freewheeling periods, such that the benefits of forced alternate freewheeling are substantially reduced.

To reduce the chances of such beating occurring, the digital word applied to the DATA input 113 of counter 112 may be provided by a pseudo-random generator 114. In the embodiment of FIG. 11, the pseudo-random generator 114 receives at its ENABLE input the output of T flip-flop 130 (the SWAP signal), such that the value of the pseudo-random digital word applied to the DATA input of clock 112 changes upon each change in the SWAP signal. Alternative embodiments are possible wherein the output of OR gate 111 is applied to the ENABLE input of pseudo-random generator 114. In one exemplary embodiment, the digital values generated by the pseudo-random generator 114 ensure that the frequency of commutations is between 8.2 and 16.4 msec. The remainder of the circuitry in FIG. 11 operates to produce the gate drive signals as previously discussed for FIG. 10.

While the circuitry of FIG. 11 was discussed in the context of using alternate power devices for freewheeling to ensure that the power supplies 91 for the gate drives are properly energized, it may be used to implement alternate freewheeling for other purposes (e.g., to reduce heat as discussed above).

It will be appreciated that although the invention has been described in relation to a switched reluctance machine it is equally applicable to the chopping control of current in other inductive loads. Thus, although some illustrative embodiments of the invention have been described in detail, there are many variations that come within the spirit and scope of the invention. Accordingly, the invention is to be limited only as a particularly defined in the appended claims.

I claim:

1. A controller for a time variable inductive load, the controller comprising:

switching means to connect the load to a source of electric power, the switching means being actuatable into a first arrangement to supply energy from the source of electric power through the switching circuit, the switching means also being actuatable into a second arrangement to return energy from the load to the source of electric power and actuatable into a third, freewheel, arrangement in which the current recirculates through the load;

control means comprising: a lower hysteresis circuit having a lower hysteresis band defined between a first signal indicative of a lower current bound and a reference current level, the circuit being operable to provide an output that changes from one output level to another output level to actuate the switching means into the third arrangement when the load current rises to the reference current level and that changes from its other output level back to its one output level to actuate the switching means into the first arrangement when the load current falls to the lower current bound; and an upper hysteresis circuit having an upper hysteresis band defined between the reference current level and a second signal indicative of an upper current bound and being operable to provide an output signal that changes from one output level to another output level to actuate the switching means into the second arrangement when the load current rises to the upper current bound and that changes from its other output level to its one output level to actuate the switching means into the third arrangement when the load current falls to the reference current level; and a swap circuit coupled to the control means, the swap circuit combined with the control means being operable to actuate the switching means into the third arrangement by differently configuring the switching means each time the third arrangement is actuated.

2. A controller as claimed in claim 1 in which the switch means include a pair of switching devices coupled to the source of electric power and to the load, the first and second switching devices being actuatable into: (i) the first switching arrangement where both the first and the second switching devices are closed to connect the load to the source of electric power; (ii) the second switching arrangement where both the first and second switching devices are opened and there is no current path from the source of electric power through the first and second switching devices and the load, and (iii) the third arrangement in which only one of the first or second switching devices is closed and current recirculates around the load through the closed switching device;

the control means being operable to alternate between actuation of each of the switching devices in the third arrangement.

3. A controller as claimed in claim 1 wherein the swap circuit is operable to receive the outputs of the lower and upper hysteresis circuits and to generate a swap output signal that toggles between a first and a second logic value in response to a change in the output of either hysteresis circuit and wherein the control means are responsive to the outputs of the hysteresis circuits and the swap circuit to produce control signals for actuating the switching means, such that the current is controlled in response to the deviation of the load current from the reference current, according to the states of the outputs from the hysteresis circuits, by: (i) actuating the first arrangement of the switching means when the load current is below the lower current bound; (ii) actuating the second arrangement of the switching means when the current is above the upper current bound; (iii) actuating the third, freewheel, arrangement of the switching means when the current reaches the reference current level from outside either of the lower and upper current bounds.

4. A controller as claimed in claim 1 wherein:

the swap circuit is coupled to receive the outputs of the lower and upper hysteresis circuits, the swap circuit generating a swap output signal that toggles between a first and a second logic level in response to: (i) a change in the output of either hysteresis circuit; or (ii) the expiration of a predetermined time period after the previous toggle of the swap output; and wherein the control means are responsive to the outputs of the hysteresis circuits and the swap circuit to produce control signals for actuating the switching means, such that the current is controlled in response to the deviation of the load current from the reference current, according to the states of the outputs from the hysteresis circuits, by: (i) actuating the first arrangement of the switching means when the current is below the lower current bound; (ii) actuating the second arrangement of the switching means when the current is above the upper current bound; (iii) actuating one configuration of the third, freewheel, arrangement of the switching means when the current reaches the reference current level from outside the lower and upper current bounds, respectively, and the swap output signal is at the first logic level and actuating another configuration of the third, freewheel, arrangement of the switching means when the current reaches the reference current level from outside the lower and upper current bounds, respectively and the swap output signal is at the second logic level.

5. The controller of claim 4 wherein the predetermined time period is fixed.

6. The controller of claim 4 wherein the predetermined time period is pseudorandomly generated upon each toggle of the swap output signal.

7. The controller of any of claims 1 in which the time variable inductive load is a winding of a reluctance machine.

8. A method of controlling the current in a time variable inductive load, the method comprising:

applying current to the load by closing a first switching device and a second switching device when the load current is below a lower current bound below a reference current level, wherein the lower current bound varies in response to variations in the reference current level;

removing current from the load by opening the first and the second switching devices when the load current is above an upper current bound above the reference current level, wherein the upper current bound varies in response to variations in the reference current level;

freewheeling current so that it recirculates through the load and only one of the switching devices when the load current rises or falls to the reference current level from outside the lower and upper current bounds, respectively; and alternating the switching device used for freewheeling between the first and the second switching devices.

9. The method of claim 8 wherein the step of alternating the switching devices used for freewheeling between the first and the second switching device comprises the step of changing the switching device through which the freewheeling current path is maintained each time a freewheeling step is performed.

10. A controller of claim 2, wherein the actuation of the switching means in the third arrangement is determined by the first and second logic value of the swap output signal.

11. A controller of claim 2, wherein the swap circuit is operable to alternate the actuation of the first and second switching devices in the third arrangement such that the first and second switching devices are each opened and closed for equal periods.

12. A controller of claim 1, wherein the swap circuit generates a clock pulse each time the output signals of the lower and upper hysteresis circuits indicate that the switching means should transition from the first arrangement or the second arrangement to the third arrangement.

* * * * *